Oct. 3, 1950
L. E. GARTNER
2,524,166
VOLTAGE AND FREQUENCY REGULATING
SYSTEM FOR MOTOR-GENERATORS
Filed Jan. 24, 1947
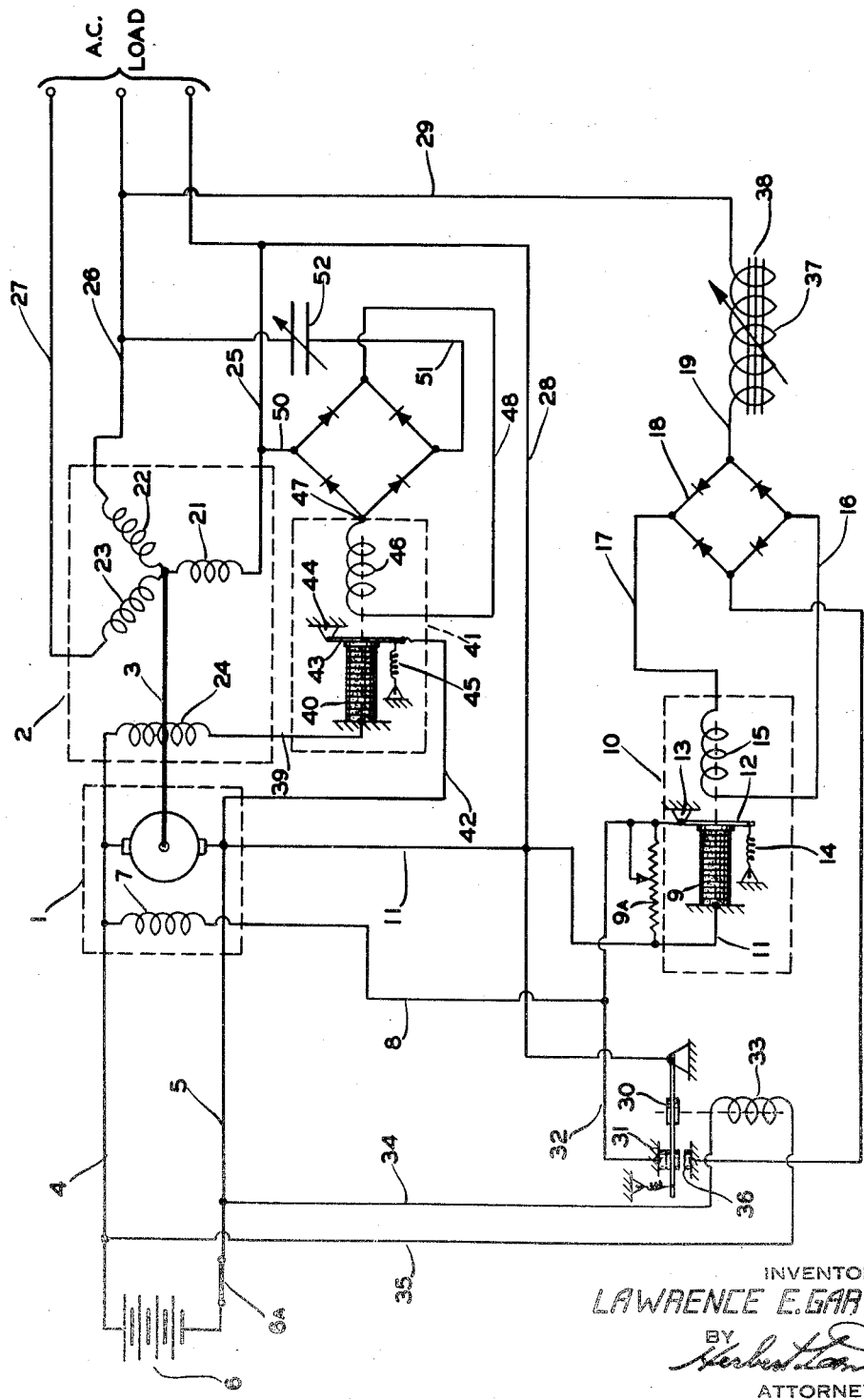
INVENTOR
LAWRENCE E. GARTNER
BY
ATTORNEY Patented Oct. 3, 1950

2,524,166

UNITED STATES PATENT OFFICE 2,524,166

VOLTAGE AND FREQUENCY REGULATING SYSTEM FOR MOTOR GENERATORS

Lawrence Edward Gartner, Hasbrouck Heights, N. J., assignor to Bendix Aviation Corporation, Teterboro, N. J., a corporation of Delaware Application January 24, 1947, Serial No. 724,130

11 Claims. (Cl. 322—24)

The present application relates to electric regulation and more particularly to a voltage and frequency regulating system for a motor-generator set.

Heretofore there has been provided frequency regulation for motor-generators in which a regulating resistor is connected in the shunt field of the motor. There is further provided a rectifier connecting a coil controlling the resistor to the A. C. output of the generator. The A. C. output is connected to the rectifier through an iron core reactor in which the impedance of the reactor increases with frequency so that at a constant output voltage, the excitation of the motor shunt field is varied so as to maintain a constant frequency.

However, in such an arrangement, in addition to responding to changes in frequency, the frequency regulator also responds to changes in the line voltage; i. e., when the line voltage goes up at a constant frequency, current in the control coil of the regulator increases so as to tend to increase the resistance of the regulating resistor and thereby affect an increase in the motor speed above the regulated speed. The reverse occurs in cases of decreasing voltage. The closeness of frequency regulation is therefore a function of the closeness of voltage regulation.

Changes in line voltage on the regulated phase may be in the order of plus or minus two and one-half percent over the entire range of operation. This error therefore is imposed upon the frequency regulator.

An object of the present invention therefore is to provide in addition to the frequency regulator described, a voltage regulating means having a control circuit including a condenser. The value of the condenser is such as to give the correct coil current at the voltage and the frequency to be regulated.

The control circuit is arranged to operate so that as the frequency increases the reactance of the capacitor decreases causing the current affecting the control coil of the voltage regulator to increase and in turn causing the regulated A. C. output voltage to decrease. The reverse effect occurs with a decreasing output frequency.

It will be seen then that in the aforenoted novel arrangement, both the frequency and voltage regulators will be operating towards an equilibrium.

Thus a tendency for a rise in frequency tends to decrease the line voltage which in turn tends to decrease the frequency. The reverse effect occurs upon a decrease in frequency.

Likewise, a tendency for an increase in line voltage tends to increase the frequency which in turn tends to decrease the voltage. The reverse effect occurs upon a decrease in voltage.

Thus it is an object of the invention to provide a frequency regulator and a voltage regulator, both regulators interacting and interdependent in the manner described so as to effect a resulting improvement in regulation of a motor-generator.

Another object of the invention is to provide a time delay device arranged so as to keep the control coil circuit of the motor regulator open until the motor has accelerated to its operating speed and thereby assure proper starting characteristics of the motor.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

The drawing is a diagrammatic showing of a voltage and frequency regulating system embodying the invention.

Referring to the drawing, there is indicated by the numeral 1 a motor which drives an A. C. generator or alternator 2 through a shaft 3.

The motor 1 has been illustrated in the form of a direct current motor deriving electrical energy from suitable direct current conductors 4 and 5 connected to a battery 6 through a starting switch 6A. The motor is provided with a suitable shunt field 7 whose flux determines the speed of rotation of the motor 1. One end of the field 7 is connected to the conductor 4, while the opposite end of the field 7 is connected by a conductor 8 to one end of a variable resistance carbon pile element 9 of a regulator indicated generally by the numeral 10. The opposite end of the carbon pile 9 is connected by a conductor 11 to the conductor 5.

The carbon pile element 9 is included in the circuit of the shunt field winding 7 so as to vary the energizing current of the shunt field winding 7 and hence the speed of the motor 1. The speed of the motor 1 increases with a decrease in the excitation of the shunt winding 7 and the speed decreases with an increase in the excitation thereof. A resistance 9A is connected across the pile 9 so as to limit the maximum resistance placed in the shunt field circuit.

The regulator 10 may be of a type described and claimed in the copending application Serial No. 570,002 filed December 27, 1944, by William G. Neild, now U. S. Patent No. 2,427,805.

The regulator 10 is illustrated diagrammatically herein as including an armature 12 pivoted at 13 and biased by a spring 14 in a direction for decreasing the resistance of the carbon pile element 9. Opposing the spring 14 is an electromagnetic control means illustratively taking the form of a winding 15.

The winding 15 is connected by conductors 16 and 17 across the output of a rectifier 18 having input conductors 19 and 20.

The A. C. generator 2 driven by the motor 1 through shaft 3 is provided with three phase rotor windings 21, 22 and 23 and an exciting field 24. Output conductors 25, 26 and 27 lead from the rotor windings 21, 22 and 23 to a suitable load not shown.

Lines 28 and 29 lead from the output lines 25 and 26. Line 28 is connected to conductor 11 and a switch arm 30. Switch arm 30 is biased by spring tension so as to normally close a contact 31 connected by a conductor 32 to conductor 8.

An electromagnetic winding 33 connected by conductors 34 and 35 across the motor input lines 4 and 5 controls the switch arm 30. When the motor 1 has accelerated to its operating speed the energization of the electromagnetic winding becomes sufficient to oppose the spring force of the switch arm 30 and cause the switch arm to open contact 31 and close a second contact 36 connected to conductor 20.

The line 29 is connected to one end of a reactance winding 37 having an iron core 38. The opposite end of the winding 37 is connected to the conductor 19. The impedance of the reactance winding 37 is equivalent to the resistance it replaces at the frequency which it is desired to maintain. Thus upon the switch arm 30 closing the contact 36, current in the winding 15 decreases with an increase in frequency at a constant voltage across the lines 25 and 26. The latter action in turn causes adjustment of the carbon pile resistance 9 so as to vary the excitation of the motor winding 7 to maintain the desired constant motor speed.

The exciting winding 24 of the A. C. generator 2 has one end connected to the input conductor 4 while the opposite end is connected by a conductor 39 to one end of a variable resistance carbon pile element 40 of a regulator indicated generally by the numeral 41. The opposite end of the carbon pile 40 is connected by a conductor 42 to the conductor 5.

The carbon pile element 40 is included in the circuit of the exciting winding 24 of the A. C. generator 2 so as to vary the exciting current and hence the output voltage from the A. C. generator 2. The output voltage from the A. C. generator 2 increases with increase in the excitation of the exciting winding 24 and decreases upon a decrease in the excitation thereof.

The regulator 41 may be of a type described and claimed in the copending application Ser. No. 570,002, filed December 27, 1944, by William G. Neild, now U. S. Patent No. 2,427,805.

The regulator 41 is illustrated diagrammatically herein as including an armature 43 pivoted at 44 and biased by a spring 45 in a direction for decreasing the resistance of the carbon pile 40. Opposing the spring 45 is an electromagnetic control means illustratively taking the form of a winding 46.

The winding 46 is connected by conductors 47 and 48 across the output of a rectifier 49 having input conductors 50 and 51 connected across the output conductors 25 and 26 of the A. C. generator 2. Connected in the conductor 51 is a condenser 52 the value of the condenser 52 is such as to give the correct current to the winding 46 at the voltage and the frequency to be regulated. The control circuit is arranged so that as the frequency increases the reactance of the capacitor decreases causing the current affecting the control coil 46 to increase and in turn causing the regulated A. C. output voltage to decrease. The reverse effect occurs upon a decrease in output frequency.

Thus the voltage regulator 41 in addition to being sensitive to voltage is also sensitive to frequency.

The regulators 10 and 41 are arranged so as to work toward an equilibrium. Thus a tendency for a rise in frequency tends through operation of the regulator 41 to decrease the line voltage which in turn tends through operation of the regulator 10 to decrease the frequency. The reverse of this also occurs.

Also a tendency for an increase in line voltage tends through the action of the regulator 10 to increase the frequency which in turn tends through action of the regulator 41 to decrease the voltage. The reverse of this also occurs.

It will be seen then that in this manner both regulators 10 and 41 are interacting and interdependent with resulting improvement in regulation.

The condenser 52 and iron core reactance 37 are preferably adjustable within limits to realize voltage and frequency adjustment external to the regulator itself. The latter adjustments may be made in conventional manner.

It will be further seen that through the action of the electromagnetically controlled switch 30, there is provided a time delay device for assuring proper starting characteristics of the motor 1.

This may also be in the form of a thermal switch arranged to close the control circuit of the regulator 10 after a predetermined time delay. In the circuit illustrated herein, however, the energizing circuit for the control winding 15 of the frequency regulator 10 is maintained open by action of the relay switch 30 until the motor 1 has accelerated to a predetermined operating speed. Upon the speed of the motor 1 reaching the predetermined speed, the voltage across the lines 4 and 5 rises sufficiently to cause the electromagnetic winding 33 to actuate relay switch 30 to open contact 31 and close contact 36 and thereby close the energizing circuit for the control coil 15. During the starting period switch 30 is biased under spring tension so as to close contact 31 and shunt the carbon pile 9 out of the control circuit for the shunt field 7 of the motor 1.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a system of the character described, in combination, an alternating current generator, a motor for driving said generator, means for controlling the speed of rotation of said motor, other means for controlling the voltage output of said generator, means forming a regulating circuit for said speed control means including first iron core reactance means for increasing the current flow in said regulating circuit upon an increase in the generated voltage and upon a decrease in the generated frequency, means forming another regulating circuit for said voltage control means including second capacitor means for increasing the current flow in said other regulating circuit upon an increase in the generated voltage and upon an increase in the generated frequency, means connecting said regulating circuits across the output of said generator, said first iron core reactance means and said second capacitor means oppositely affecting the current flow in said regulating circuits upon frequency changes and so arranged as to coact in effecting a predetermined regulated voltage and frequency output from said generator.

2. In a system of the character described, in combination, an alternating current generator, a motor for driving said generator, means for controlling the speed of said generator in response to the frequency output of said generator, a device for connecting said control means into operation, and said device including an operating winding responsive to input motor voltage to effect the latter connection.

3. In a system of the character described, in combination, an alternating current generator, a motor for driving said generator, a source of electrical energy for energizing said motor, means for regulating the speed of said generator in response to the frequency output of said generator, a time delay device for connecting said regulating means into operation, and said time delay device including control means responsive to input motor voltage to effect the latter connection.

4. In a system of the character described, in combination, an alternating current generator, a motor for driving said generator, a source of electrical energy for energizing said motor, means for controlling the speed of said generator in response to the frequency output of said generator, a relay switch mechanism for connecting said control means into operation, and an electromagnetic means to operate said relay switch mechanism, said electromagnetic means being connected across said source of electrical energy and continuously affected thereby for actuating said relay switch mechanism to connect said control means into operation in response to the voltage of said source exceeding a predetermined value.

5. In a system of the character described, in combination, an alternating current generator, a motor for driving said generator, means for controlling the speed of said generator in response to the frequency output of said generator, a source of electrical energy for energizing said motor, a relay switch mechanism for connecting said control means into operation, and an electromagnetic winding to operate said relay switch mechanism, said winding connected to said source of electrical energy for actuating said switch mechanism after initial energization of said motor has been effected and in response to a predetermined input motor voltage indicative of a predetermined speed.

6. In a circuit of the class including an alternating current generator, an electric motor for driving said generator, a source of electrical energy for said motor, means for regulating the speed of said motor including a variable resistance, the improvement comprising a relay switch arm, a first contact cooperating with said switch arm so as to shunt said resistance, a second contact cooperating with said switch arm for connecting said variable resistance and said regulating means into operation, means biasing said switch arm so as to close said first contact, an electromagnetic winding continuously connected across said source of electrical energy for actuating said switch arm so as to open said first contact and close said second contact after initial energization of the motor and in response to a predetermined input motor voltage effected upon the speed of the motor exceeding a predetermined value.

7. In a system of the character described, in combination, an alternating current generator, an electric motor for driving said generator, a source of electrical energy for energizing the electrical motor, a shunt field winding for controlling the speed of the motor and connected across the source of electrical energy, a variable resistance carbon pile element connected in the shunt field circuit of said motor, an electromagnetic winding for regulating the carbon pile element, a rectifier, a circuit for connecting the electromagnetic winding through the rectifier to the output of the generator, said circuit including an iron core reactance for affecting said electromagnetic winding so as to increase the regulated frequency with increase in the voltage output of the generator, an exciting winding for controlling the voltage output of said generator, another variable resistance carbon pile element connected in the exciting field circuit of said generator, an electromagnetic winding for regulating the other carbon pile element, a rectifier, a second circuit for connecting the electromagnetic winding through the rectifier to the output of the generator, said second circuit including a capacitor for affecting the last mentioned electromagnetic winding so as to decrease the regulated voltage with increase in the output frequency of the generator, said first and second circuits thereby cooperating in maintaining a predetermined regulated condition.

8. In a system of the character described, in combination, an alternating current generator, an electric motor for driving said generator, a source of electrical energy for energizing the electrical motor, a shunt field winding for controlling the speed of the motor and connected across the source of electrical energy, a variable resistance carbon pile element connected in the shunt field circuit of said motor, an electromagnetic winding for regulating the carbon pile element, a rectifier, a circuit for connecting the electromagnetic winding through the rectifier to the output of the generator, said circuit including an iron core reactance for affecting said electromagnetic winding so as to increase the regulated frequency with increase in the voltage output of the generator, an exciting winding for controlling the voltage output of said generator, another variable resistance carbon pile element connected in the exciting field circuit of said generator, an electromagnetic winding for regulating the other carbon pile element, a rectifier, a second circuit for connecting the electromagnetic winding through the rectifier to the output of the generator, said second circuit including a capacitor for affecting the last mentioned electromagnetic winding so as to decrease the regulated voltage with increase in the output frequency of the generator, said first and second circuits thereby cooperating in maintaining a predetermined regulated condition, a relay switch mechanism for shunting the first mentioned carbon pile element, an electromagnetic winding for actuating said switch mechanism to a second position for connecting said first mentioned carbon pile element into operation and effective after initial energization of the motor and upon the speed of the motor exceeding a predetermined value.

9. In a system of the character described, in combination, an alternating current generator, an electric motor for driving said generator, a source of electrical energy for energizing the electrical motor, a shunt field winding for controlling the speed of the motor and connected across the source of electrical energy, a variable resistance element connected in the shunt field circuit of said motor, an electromagnetic winding for regulating the element, a circuit for connecting the electromagnetic winding to the output of the generator, said circuit including an iron core reactance for affecting said electromagnetic winding so as to increase the regulated frequency upon an increase in the voltage output of the generator and upon a decrease in the output frequency of said generator, an exciting winding for controlling the voltage output of said generator, another variable resistance element connected in the exciting field circuit of said generator, an electromagnetic winding for regulating the other element, a second circuit for connecting the electromagnetic winding to the output of the generator, said second circuit including a capacitor for affecting the last mentioned electromagnetic winding so as to decrease the regulated voltage upon an increase in the output frequency of the generator and upon an increase in the output voltage of said generator, said first and second circuits thereby cooperating in maintaining a predetermined regulated condition.

10. In a system of the character described, the combination comprising, an alternating current generator, an electric motor for driving said generator, a source of electrical energy for energizing the electric motor, a shunt field winding for controlling the speed of the motor and connected across the source of electrical energy, first regulating means for varying the energization of said field winding, said first means including an iron core reactance for increasing the energization of said field winding upon an increase in the output frequency of the generator and upon a decrease in the output voltage of said generator so as to decrease the speed of said motor; an exciting field winding for controlling the voltage output of said generator, second regulating means for varying the energization of said exciting field winding, said second means including a capacitor for effecting a decrease in the energization of said exciting field winding upon an increase in the output frequency of the generator and upon an increase in the output voltage of said generator so as to decrease the voltage output of said generator, said first and second regulating means cooperating in maintaining a predetermined voltage and frequency output from said generator.

11. The combination comprising an alternating current generator, an electric motor for driving said generator, a source of electrical energy for energizing the electric motor, a shunt field winding for controlling the speed of the motor and connected across the source of electrical energy, an exciting field winding for controlling the voltage output of said generator, first regulating means for varying the energization of said motor field winding, means connecting the first regulating means across the output of the generator, said connecting means including a frequency responsive element for affecting said first regulating means so as to increase the energization of said motor field winding upon an increase in the output frequency of the generator and thereby decrease the speed of the motor, second regulating means for varying the energization of said exciting field winding, other means connecting said second regulating means across the output of the generator, said other connecting means including another frequency responsive element for affecting said second regulating means so as to decrease the energization of said generator field winding upon an increase in the output frequency of the generator and thereby decrease the output voltage of the generator, and said first and second regulating means acting to simultaneously decrease the energization of said motor and generator field windings upon an increase in the output voltage of said generator.

LAWRENCE EDWARD GARTNER.

REFERENCES CITED

The following references are of record in the file of this patent:

UNITED STATES PATENTS

| Number | Name | Date |
|---|---|---|
| 1,647,192 | Nyquist | Nov. 1, 1927 |
| 1,804,126 | Stoller | May 5, 1931 |
| 1,959,161 | Grondahl | May 15, 1934 |
| 2,366,167 | Adorjan et al. | Jan. 2, 1945 |